April 2, 1935. H. W. O'DOWD 1,996,434
LIQUID HEATING APPARATUS
Filed June 26, 1930 3 Sheets-Sheet 1

INVENTOR.
Henry W. O'Dowd
BY
ATTORNEYS.

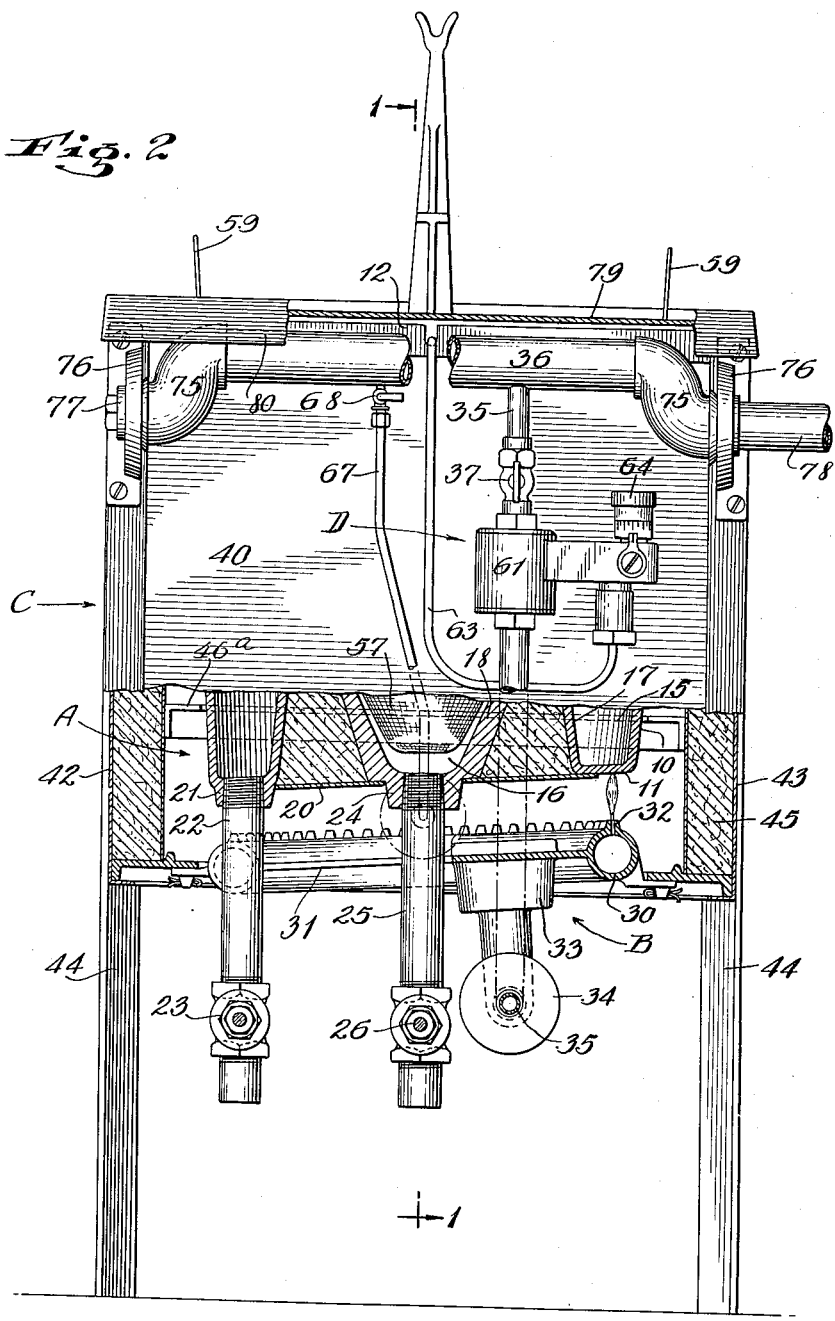

April 2, 1935.   H. W. O'DOWD   1,996,434
LIQUID HEATING APPARATUS
Filed June 26, 1930   3 Sheets-Sheet 3

INVENTOR.
Henry W. O'Dowd
BY
ATTORNEYS.

UNITED STATES PATENT OFFICE 1,996,434

LIQUID HEATING APPARATUS

Henry W. O'Dowd, Jersey City, N. J., assignor to Standard Gas Equipment Corporation, a corporation of Maryland Application June 26, 1930, Serial No. 463,883

13 Claims. (Cl. 53—7)

This invention relates to liquid heating apparatus, more particularly of the gas-fired variety, and though adapted for general application, is intended especially for cooking purposes, such as deep-fat frying.

An important feature of the invention is the provision of an apparatus for heating liquids containing sediment and wherein the sediment will be free to settle in a zone which is cooler than the main body of the liquid.

Another feature of the invention is the provision of such an apparatus which can be easily cleaned from time to time so as to be maintained in a sanitary condition.

Another feature of the invention is the provision of a gas-fired liquid heating apparatus with novel means for automatically lighting the heating burner when gas is supplied to it and for automatically maintaining the heated liquid uniformly at a predetermined temperature.

Another feature of the invention is the provision of such an apparatus of extremely simple construction, lending itself to economical production, and capable of operating at high efficiency.

The foregoing and other objects, features and advantages of the invention will be readily understood from the following description in connection with the accompanying drawings, wherein one form of the invention has been shown by way of illustration.

In the drawings:

Fig. 2 is a front elevation thereof, with parts broken away and parts shown in longitudinal section;

While the invention has many different industrial and domestic uses, it has been shown in the accompanying drawings as embodied in an apparatus for cooking foods in deep fat or oil. Such an apparatus comprises essentially a vessel A for containing the liquid to be heated, and a heating unit B, said vessel and heating unit being disposed within a heat-insulating casing C, and provided with temperature controlling means D.

Figures 1, 5:
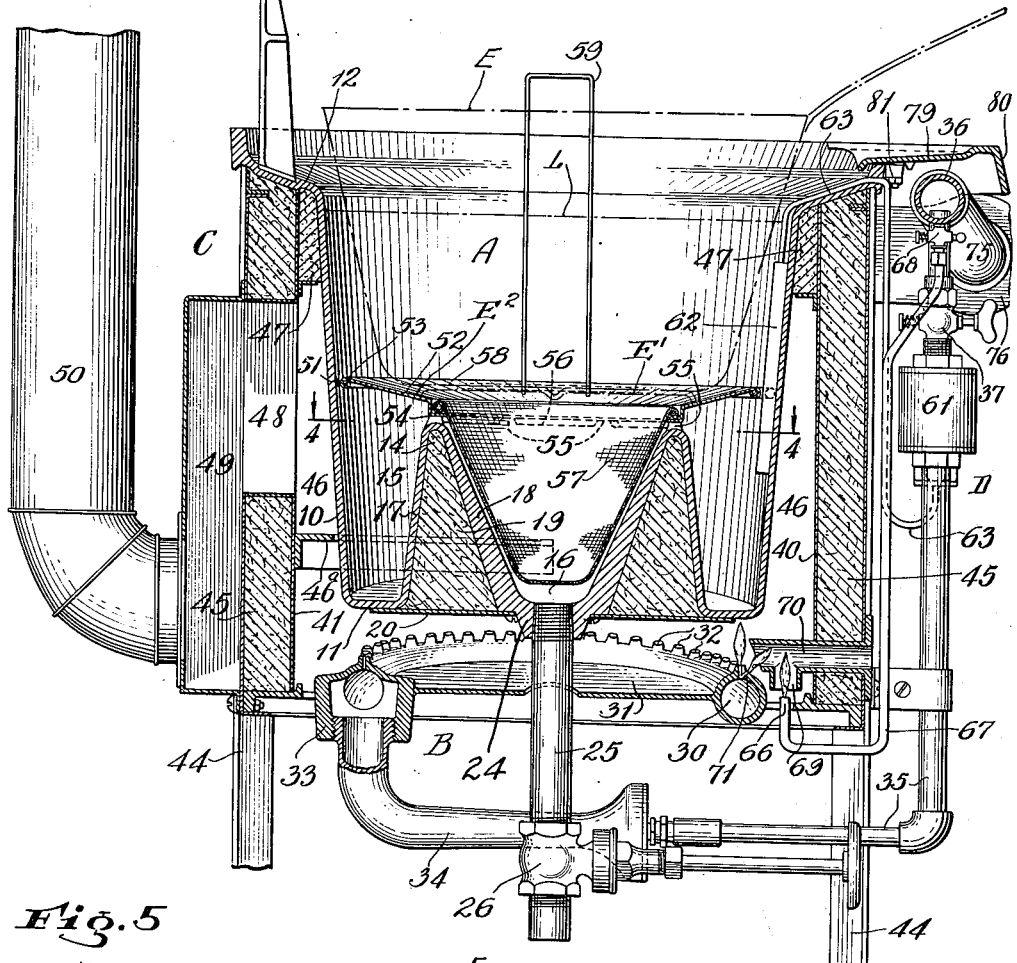
Figure 1 is a vertical transverse sectional view through a heating apparatus embodying the invention, the section being taken substantially on line 1—1 of Fig. 2.
Fig. 5 is a fragmentary sectional view through the vessel and showing a modified form of baffle within it.
Figure 3:
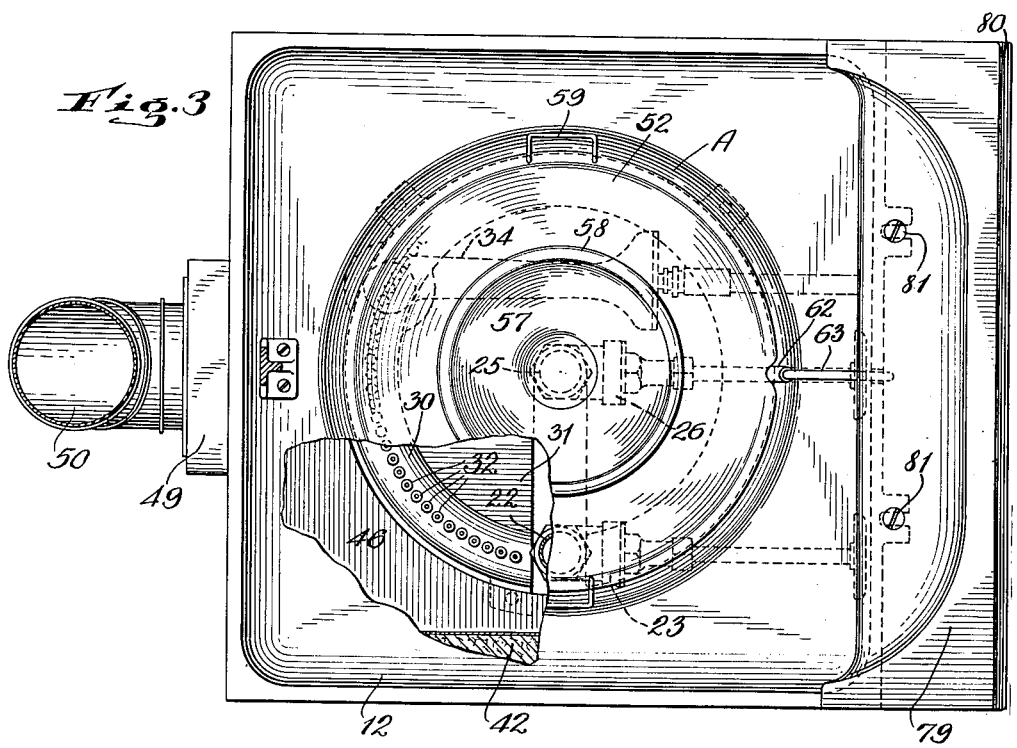
Fig. 3 is a top plan view of the apparatus.
Figure 4:
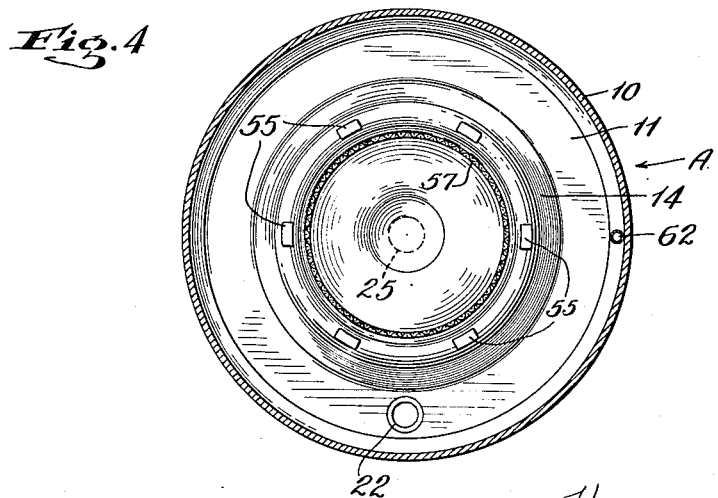
Fig. 4 is a fragmentary horizontal sectional view taken on line 4—4 of Fig. 1.

The vessel A is comparatively deep, being preferably formed as a single casting of iron, aluminum, or other suitable material, and comprises a substantially cylindrical side wall 10, a bottom wall 11, and an upper marginal rim or flange 12. For convenience in manufacture, the side wall 10 is slightly tapered as shown in Fig. 1. Within the vessel, and extending upwardly from the bottom thereof, there is an imperforate annular wall 14 spaced from the side wall 10 and forming two concentric liquid wells 15 and 16 which communicate with each other only across the top of the wall 14. While the annular wall 14 may be otherwise constructed or applied, it is herein shown as composed of oppositely inclined frusto-conical portions 17 and 18 formed integral with the bottom wall 11 and merging together at their upper ends, and defining between them a space of substantial proportions. This space between the wall portions 17 and 18 may be left open if desired, but it is preferably filled with a suitable heat-insulating material 19 such as asbestos, and closed at its lower end by an annular metal plate 20 which serves to retain said heat-insulating material in place.

The bottom wall 11 is preferably inclined slightly toward one side of the apparatus as best shown in Fig. 2, and is provided at its lowermost side with an internally screw threaded boss 21 for the accommodation of a drain pipe 22 having a manually controlled valve 23. Similarly, the center of the bottom wall 11, i.e., the bottom of the central well 16, is provided with an internally screw threaded boss 24 for the accommodation of a drain pipe 25 having a manually controlled valve 26. By opening the valves 23 and 26 from time to time, the vessel may be emptied to facilitate the cleaning of the vessel or the refilling of the same with fresh liquid, and more particularly the drain pipe 25 is useful in some instances for removing sediment which collects in the well 16 as will later be explained.

The heating unit B, in the illustrated embodiment of the invention, comprises a Bunsen burner 30 which is substantially annular and supported in fixed position at a suitable distance below and parallel with the bottom wall 11 of the vessel A.

The burner 30 is provided with a centrally apertured web 31 for the purpose of reenforcement and is formed in its upper side with an annular series of flame ports 32 which direct the flames upwardly against the bottom wall 11 of the vessel or, rather, against the bottom of the outer well 15. At one side, the burner 30 is provided with an enlarged boss 33 for the connection of a mixing tube 34 of any ordinary or preferred construction, and to which gas is supplied through a pipe 35 from a manifold 36. A manually operated stop cock or valve 37 is, of course, located in the pipe 35 in order to turn on and cut off the supply of gas to the burner, and primary air is admitted to the mixing tube 34 in the usual manner, while secondary air is drawn in around the outer sides of the burner 30.

As the parts are thus constructed and arranged, the liquid within the vessel A will be heated in the bottom of the well 15, but by virtue of the construction of the annular wall 14 with its heat-insulating filling 19, the contents of the central well 16 will be protected from the heat of the burner and maintained at a lower temperature.

The casing C is substantially square in horizontal section and comprises a front wall 40, a rear wall 41, and opposite side walls 42 and 43, all of said walls being secured together at their meeting corners by upright steel angle bars 44, the lower ends of which extend sufficiently below the walls to constitute legs for the support of the complete apparatus. In the illustrated embodiment, the respective walls 40 to 43 inclusive are formed of separated inner and outer metal plates filled with heat-insulating material 45, but of course they can be otherwise constructed if desired, and said casing walls are spaced from the side wall 10 of the vessel A in such a manner as to define a heating chamber 46 which completely surrounds the vessel and which is closed at its upper end by heat-insulating filler blocks 47. The upper marginal rim or flange 12 of the vessel preferably overlies the upper edges of the casing walls, as best shown in Fig. 1, whereby to provide suitable support for the vessel and at the same time to nicely finish off the top of the casing, and to prevent drippings from entering the heating chamber 46.

By enclosing the vessel A within the casing C, it will be seen that the contents of the vessel are heated not only by the direct application of heat to the bottom wall 11, but by the circulation of the hot gases around and through the chamber 46, so that a substantial heating surface is provided. An exhaust opening 48 is formed in the rear casing wall 41 to provide communication between the upper end of the heating chamber 46 and an exhaust duct 49, the lower end of the latter being connected with a flue 50 for carrying off the products of combustion after the heat has been transferred to the liquid in the vessel.

In order to retard the passage of the hot gases through the rearward portion of the heating chamber 46 and thereby to take fullest advantage of the heat of said gases, a horizontal baffle plate 46ᵃ is disposed in said chamber at a point below the exhaust opening 48, said baffle plate extending from the adjacent casing walls to the side wall 10 of the vessel. This baffle plate is the full length of the rear casing wall 41, and at opposite sides is substantially half as wide as the side casing walls 42 and 43. In other words, the baffle plate 46ᵃ is substantially rectangular in outline and has a semi-circular notch cut out of its front edge to accommodate the vessel and to fill the space between the rearward half of the vessel and the casing. Thus the hot gases from the rearward half of the burner 30 rise until they strike the baffle 46ᵃ whereby they are directed forwardly around the side of the vessel and thence upwardly and rearwardly above the baffle to the flue.

As previously stated, the illustrated form of the invention is particularly adapted for cooking foods in deep melted fat or oil. In such cooking processes, minute particles become detached from the food and form a sediment in the liquid cooking medium, and it is desirable to prevent this sediment from becoming charred or carbonized by contact with the hot walls of the vessel. If the sediment should become overheated, charred, or carbonized, it will flavor the cooking medium and render it unsuitable for use for other kinds of food, and it is for the purpose of overcoming this undesirable tendency that the annular wall 14 is provided to shield the central portion of the bottom of the vessel from the heat of the burner, and thus effectively to form a central settling zone of lower temperature. There is no direct communication between the bottom of the well 15 and the bottom of the well 16, and hence the convection currents in the liquid will be strongest in the outer well 15 and will be practically nil in the bottom of the central well 16. Thus with the present invention, the sediment is free to settle in the central well 16 without subjection to the heat of the burner and without being stirred up by the circulation currents, and it can easily be removed from time to time when necessary.

The convection currents rising in the outer well 15 will prevent the sediment from falling into the bottom of said outer well, but in order more positively to direct the sediment into the inner well 16, an inwardly and downwardly tapering annular shelf or baffle 52 is arranged within the vessel A to overlie the top of the outer well. At its outer periphery, this annular shelf or baffle 52 is curled or beaded as at 53, and is of such proportions as to be spaced a slight distance from the inner surface of the wall 10 to provide a liquid circulating space 51 between said wall and the baffle. At its inner periphery, the annular baffle is formed with a double offset flange 54 which seats upon the upper faces of spaced lugs 55 formed on the upper end of the annular wall 14. Between the several spaced lugs 55, circulation passages 56 are formed through which the liquid may also circulate.

The food to be cooked is placed in a wire mesh basket E (Fig. 1) which is adapted to be supported within the vessel by the annular baffle 52 so as to immerse the food in the cooking medium. Secured to the bottom of the basket is a wire base E¹ having a plurality of spaced loops E² extending downwardly to form feet which rest upon the baffle 52 and maintain the bottom of the basket in spaced relation to the baffle whereby the heated liquid will be free to circulate under the basket, i. e., between the bottom of the basket and the top of the baffle.

It will now be clear that full provision has been made to permit circulation of the heated liquid in such a way as to carry the heat to the food very effectively, yet leaving the sediment free to settle out of the circulating liquid and into a zone of lower temperature. Thus the heated liquid in the outer well 15 passes upwardly through the space 51 to points above the baffle 52, thence radially inward through the basket E and the food therein and also under the basket, then down through the large central opening in the baffle, and then radially outward through the passages 56 and over the wall 14 into the well 15 again. By reason of the fact that the central well 16 is insulated from the heat of the burner and free from circulation, there will be practically no agitation in this part of the liquid, and as the circulating portion of the liquid sweeps over said well on its way back to the outer well, the sediment, being heavier than the liquid, will be precipitated into this cool, non-circulating zone.

When desired, a substantially-conical strainer 57, formed of galvanized wire mesh, is supported in the central well 16, it being provided at its upper edge with a bead 58 which rests upon the upper side of the double offset flange 54, substantially filling the central opening therein. Thus, the member 52 serves the multiple function of supporting the strainer, directing the sediment into the strainer, and maintaining an effective circulation of the convection currents to distribute the heat, and in addition it serves to support the food containing basket during the cooking operation.

The shelf or baffle 52 and the strainer 57 may be removed from the vessel by means of bails or handles 59 provided at diametrically opposite sides of the baffle member, said bails or handles extending upwardly beyond the top of the upper marginal flange 12.

When it is desired to clean out the vessel, it is only necessary to open the drain valve 23 to drain off the clear liquid, after which the sediment can be removed. This can be done by lifting out the strainer 57 from the top of the vessel, or, if no strainer is used, by opening the drain valve 26. This leaves the bottom and inside of the vessel entirely open and capable of being scrubbed or scoured with a brush, mop, or the like.

In order to maintain the heated liquid at a uniform temperature, the controlling means D is employed as illustrated in Figs. 1 and 2. Such controlling means comprises a thermostatically operated valve 61 which is arranged in the gas supply pipe 35 preferably at a point below the manually operated cock 37, said valve 61 being of a standard commercial snap-action type and under the control of a temperature-responsive element 62 disposed within the vessel A at one side thereof. The temperature-responsive element 62 is completely immersed in the heated liquid and the expansion and contraction thereof are translated to the thermostatic valve 61 through a tubular conductor 63 extending over the front portion of the upper marginal rim 12 of the vessel and downwardly a certain distance in front of the casing wall 40. The valve 61 is furthermore provided with adjusting means 64 whereby the flow of gas through the valve may be selectively varied to give different degrees of heat for different cooking operations.

While the heating burner 30 may be lighted in other ways, it is preferred to make use of the automatic lighting means shown in Fig. 1. Such means comprises a constantly burning pilot light 66 which is disposed upon the lower or inner end of a small gas conducting tube or pipe 67 connected to the gas manifold 36 independently of the main burner supply line and equipped with a manually operated cock or valve 68. The pilot burner 67 extends upwardly toward an opening 69 in the bottom of a lighting tube 70 extending through the front wall 40 of the insulating casing, said tube 70 being arranged substantially in line with the upper surface of the heating burner 30. The inner end of the lighting tube 70 terminates adjacent to the burner 30 and is preferably beveled off as illustrated so as easily to receive any gas which might issue from a special inclined flame port 71 formed in one side of the burner 30. Such gas will be conducted through the lighter tube 70 and, upon reaching the flame of the pilot light 66, will be ignited, carrying the flame back to the main body 30 to ignite the gas which issues from the flame ports 32. This arrangeme is highly desirable not only because it facilitates the lighting of the burner 30, but because it promotes safety in the installation inasmuch as it is impossible for any unburned gas to escape from the heating burner 30, so long as the pilot light 66 is burning.

The gas manifold 36 extends across the front wall 40 of the casing close to the upper edge thereof, and comprises a length of pipe fitted at its opposite ends with double-bend elbows 75 mounted in supporting brackets 76. One of the elbows 75 is shown closed by a plug 77, while the other is connected to a gas main 78 in the usual way. It is desirable to protect the gas manifold 36 and the temperature controlling means D from being spattered by spilled liquid or food, and for this purpose a shelf 79 is mounted upon the upper front edge of the device. This shelf 79 preferably extends the full length of the front wall of the casing and has its inner or rear edge inclined downwardly and overlying the adjacent portion of the upper marginal rim 12 of the vessel so as to direct drippings back into the vessel. The shelf is of sufficient width to completely cover the manifold 36, being formed at its front edge with a downwardly directed flange 80, and it is detachably secured to the upper marginal rim 12 of the vessel A by fastening elements 81.

Thus, the whole device is capable of being easily maintained in a strictly sanitary condition, yet the parts are of extremely simple construction and capable of being manufactured at comparatively low cost.

In Fig. 5 a modified form of the invention has been shown, wherein the lugs 55 have ben omitted from the top of the annular wall 14 and, instead, they have been cast integral with the annular shelf of baffle 52ᵃ as indicated at 55ᵃ. This construction is preferable to that first described, inasmuch as the lugs 55ᵃ not only support the baffle 52ᵃ above the top of the wall 14, but they also serve to center said baffle by reason of the fact that they extend downwardly to engage portions of the outer side of said wall. Of course, the spaces 56ᵃ between the lugs 55ᵃ serve as the spaces 56 to permit the circulation of the liquid over the wall 14 in passing from above the well 16 back into the well 15.

In this figure, the strainer 19 has been omitted as may be done in practice, although in many cases it will be preferred because it facilitates removal of the sediment from the central well. Furthermore, instead of forming the strainer 19 of wire gauze, this member may be in the nature of a removable imperforate sediment-collecting cup.

When in use the vessel A is filled with oil or melted fat substantially up to the level indicated by the line L in Fig. 1 and with the baffle 52 and strainer 57 in place as shown. After the burner B has been lighted for a sufficient length of time to bring the temperature of the liquid cooking medium up to the desired point, the wire mesh basket E containing the food to be cooked is placed within the vessel so that the food will be immersed in the liquid. The greatest agitation caused by the convection currents will take place within the outer well 15, yet the heat will be freely distributed throughout the main body of the liquid by reason of the freedom of circulation upwardly past the outer periphery of the baffle 52 and back through the passages 56 at the inner edge of said baffle. In other words, the heat will effectively be carried, as previously explained, to the body of the liquid wherein the food is immersed, and those food particles which are detached will be free to settle, falling either directly into the central well or upon the shelf 52 and then directed downwardly into said central well. Since said central well is shielded and maintained at a lower temperature and substantially free from agitation by the convection currents, such detached food particles or sediment will not become carbonized and will have no injurious effect upon the liquid cooking medium. Consequently, the liquid will be maintained in a pure state for a much greater period than has been possible heretofore, resulting in considerable saving in fat or oil, and rendering it capable of use for many different kinds of food products.

It will now be evident that an improved liquid heating apparatus of high thermal efficiency has been provided wherein the sediment in the liquid will effectively be prevented from carbonizing by virtue of its settling in a zone of lower temperature than that required for the cooking operation. The invention is of course susceptible of numerous modifications in the details of construction and arrangement of parts, and the right is therefore reserved to make such changes as fall within the scope of the appended claims without departing from the spirit of the invention.

Having thus described my invention, what I claim is:

1. Liquid heating apparatus comprising a vessel for containing the liquid to be heated, a gas burner for applying heat to the bottom of the vessel adjacent the outer edge thereof, the central portion of the bottom being disposed above the plane of the burner and means for shielding the central portion of the bottom from the heat of the burner.

2. Liquid heating apparatus comprising a vessel for containing the liquid to be heated, said vessel being formed in its bottom with inner and outer liquid wells which communicate with each other only at their upper ends, the outer well surrounding the inner well and means for applying heat to the bottom of the outer one only of said wells.

3. Liquid heating apparatus comprising a vessel for containing the liquid to be heated, an imperforate annular wall extending upwardly from the bottom of the vessel and providing inner and outer liquid wells, and means for applying heat to the lower portion of the vessel outside of said annular wall, whereby the liquid in the inner well will be protected from the heat applied to the liquid in the outer well.

4. Liquid heating apparatus comprising a vessel for containing the liquid to be heated, an imperforate annular wall extending upwardly from the bottom of the vessel in spaced relation to the sides thereof whereby to provide two concentric liquid wells, and an annular gas burner for applying heat to the bottom of the outer well only.

5. Liquid heating apparatus comprising a vessel for containing the liquid to be heated, an imperforate wall extending upwardly from the bottom of the vessel in spaced relation to the side walls thereof and forming inner and outer liquid wells, a gas burner for applying heat to the bottom of the outer liquid well, the inner well being protected from said heat by the wall within the vessel, and a sediment strainer removably supported within the inner well.

6. Liquid heating apparatus comprising a vessel for containing the liquid to be heated, an imperforate annular wall extending upwardly from the bottom of the vessel in spaced relation to the side walls thereof and forming two concentric liquid wells, an annular gas heating burner for generating heat and applying it to the bottom of the outer liquid well only, the inner well being protected from said heat by the annular wall within the vessel, and an annular baffle member extending laterally from the top of said annular wall into proximity with the side wall of the vessel.

7. In or for a liquid heating apparatus, a vessel for containing the liquid to be heated, said vessel having a substantially cylindrical side wall and a bottom wall, said bottom wall being slightly inclined toward one side, and annular portions thereof extending upwardly to define two concentric liquid wells in communication with each other only at their upper ends, and drain means in the bottoms of said liquid wells.

8. Liquid heating apparatus comprising a vessel for containing the liquid to be heated, a hollow wall extending upwardly from the bottom of the vessel in spaced relation to the sides thereof whereby to provide inner and outer liquid wells, a gas burner for applying heat to the bottom of the outer well only, and a packing of heat-insulating material within said hollow wall to protect the inner well from the heat generated by the burner.

9. Liquid heating apparatus comprising a vessel for containing the liquid to be heated, an imperforate annular wall extending upwardly from the bottom of the vessel in spaced relation to the side walls thereof and forming two concentric liquid wells, an annular gas heating burner for applying heat to the bottom of the outer liquid well only, the inner well being protected from said heat by the annular wall within the vessel, and an annular baffle member disposed over the outer well and inclined downwardly toward the inner well, said baffle member being supported at its inner edge in spaced relation to the top of said annular wall, and having its outer edge spaced from the side wall of the vessel.

10. Liquid heating apparatus comprising a vessel for containing the liquid to be heated, an imperforate annular wall extending upwardly from the bottom of the vessel in spaced relation to the side walls thereof and forming two concentric liquid wells, an annular gas heating burner for applying heat to the bottom of the outer liquid well only, the inner well being protected from said heat by the annular wall within the vessel, an annular baffle member disposed over the outer well and inclined downwardly toward the inner well, said baffle member being supported at its inner edge in spaced relation to the top of said annular wall, and having its outer edge spaced from the side wall of the vessel, and a sediment collecting cup removably supported within the inner well.

11. Liquid heating apparatus comprising a vessel for containing the liquid to be heated, an imperforate annular wall extending upwardly from the bottom of the vessel in spaced relation to the side walls thereof and forming two concentric liquid wells, an annular gas heating burner for applying heat to the bottom of the outer liquid well only, the inner well being protected from said heat by the annular wall within the vessel, an annular baffle member disposed over the outer well and inclined downwardly toward the inner well, said baffle member being supported at its inner edge in spaced relation to the top of said annular wall, and having its outer edge spaced from the side wall of the vessel, the baffle member being further characterized by a central opening formed with means for supporting a sediment collecting cup, and a sediment collecting cup disposed within the inner well and loosely supported by said supporting means on the annular baffle member.

12. Liquid heating apparatus comprising a vessel for containing the liquid to be heated, the bottom of said vessel being slightly inclined toward one side, an imperforate tapered annular wall extending upwardly from the bottom of the vessel in spaced relation to the side walls thereof and forming two concentric liquid wells, a valve-controlled drain in the bottom of each of said liquid wells, a casing of heat-insulating material surrounding said vessel in spaced relation to the outer sides thereof whereby to provide an outer heating chamber which is closed at its top, and provided at one side with an exhaust opening, a gas burner for applying heat to the bottom of the outer liquid well, the inner well being protected from said heat by the tapered annular wall within the vessel, a removable sediment collecting cup within the central well, an annular baffle member extending laterally from the top of said tapered annular wall into proximity with the side wall of the vessel and having a central opening for the accommodation of said sediment collecting cup, and there being liquid circulation passages between the inner edge of said baffle member and the top of said annular wall, a thermostatic valve for controlling the flow of gas to the burner, said thermostatic valve having a temperature-responsive element immersed in the heated liquid, a constantly burning pilot light disposed at one side of the casing and below the vessel, and a burner lighting tube extending between the heating burner and the pilot light, whereby automatically to light the heating burner when gas is supplied to it.

13. Liquid heating apparatus comprising a vessel for containing the liquid to be heated, partitioning means extending upwardly from the bottom of and within the vessel and defining separate but communicating enclosures, said enclosures forming non-circulating and circulating zones respectively for the liquid, and means for applying heat to that part only of the vessel wherein the liquid circulates.

HENRY W. O'DOWD.